US007173094B2

(12) United States Patent
Morimoto et al.

(10) Patent No.: US 7,173,094 B2
(45) Date of Patent: Feb. 6, 2007

(54) MOLDINGS OF FLUORORUBBERS AND PROCESS FOR THEIR PRODUCTION

(75) Inventors: Kazuki Morimoto, Hamamatsu (JP); Naoya Kuzawa, Hamamatsu (JP); Hitoshi Ogura, Hamamatsu (JP); Takumi Arisawa, Hamamatsu (JP); Takeshi Kuboyama, Hamamatsu (JP); Kinro Hashimoto, Hamamatsu (JP); Hitoshi Yamada, Hamamatsu (JP); Masayuki Saito, Ichihara (JP); Tetsuya Miwa, Ichihara (JP)

(73) Assignees: Nichias Corporation, Tokyo (JP); Asahi Glass Co., Ltd., Tokyo (JP)

( * ) Notice: Subject to any disclaimer, the term of this patent is extended or adjusted under 35 U.S.C. 154(b) by 0 days.

(21) Appl. No.: 10/486,388

(22) PCT Filed: Sep. 20, 2002

(86) PCT No.: PCT/JP02/09709

§ 371 (c)(1), (2), (4) Date: Feb. 9, 2004

(87) PCT Pub. No.: WO03/029306

PCT Pub. Date: Apr. 10, 2003

(65) Prior Publication Data

US 2005/0075461 A1 Apr. 7, 2005

(30) Foreign Application Priority Data

Sep. 26, 2001 (JP) ............................ 2001-293888
Jul. 15, 2002 (JP) ............................ 2002-205999

(51) Int. Cl.
*C08L 27/18* (2006.01)
*D01F 6/12* (2006.01)
*B05D 7/02* (2006.01)
*C08F 8/00* (2006.01)
*C08L 27/00* (2006.01)
*C08J 11/04* (2006.01)

(52) U.S. Cl. ...................... 525/326; 525/520; 525/194; 525/199; 524/520; 264/127; 264/187; 264/211; 264/233; 427/212; 521/41

(58) Field of Classification Search ................ 526/255; 525/326.3, 326, 520, 194, 199; 524/520; 521/41; 427/212; 264/127, 211
See application file for complete search history.

(56) References Cited

U.S. PATENT DOCUMENTS 2,593,583 A * 4/1952 Lontz ..................... 528/502 F
3,718,558 A 2/1973 Talbata et al.
3,752,789 A 8/1973 Khan
3,825,510 A 7/1974 Yamamoto et al.
4,128,517 A 12/1978 Kydonieus
5,037,921 A 8/1991 Carlson
5,474,850 A 12/1995 DelRosario et al.
5,686,139 A * 11/1997 Grimm et al. .............. 427/212
5,700,866 A * 12/1997 Tabb .......................... 524/520
5,762,846 A * 6/1998 Blankenbeckler et al. .. 264/127
6,803,435 B2 * 10/2004 Coggio et al. .............. 526/229

FOREIGN PATENT DOCUMENTS

| | | |
|---|---|---|
| EP | 0 446 725 A1 | 9/1991 |
| EP | 1031607 | 8/2000 |
| GB | 767 440 | 2/1957 |
| GB | 1 332 259 | 10/1973 |
| JP | 48-030744 | 4/1973 |
| JP | 54-106552 | 8/1979 |
| JP | 04-033902 | 2/1992 |
| JP | 06-192321 | 7/1994 |
| JP | 09-500163 T | 1/1997 |
| JP | 11 116710 A | 4/1999 |
| JP | 11-302394 | 11/1999 |
| JP | 2000-7732 | 1/2000 |
| JP | 2000-239470 | 9/2000 |
| JP | 2001-181350 | 7/2001 |
| JP | 2001-247627 | 9/2001 |
| JP | 2003-096220 | 4/2003 |
| JP | 2003-277445 | 10/2003 |
| WO | WO 99/50319 | 1/1999 |

OTHER PUBLICATIONS

Textbook of olymer Science, Billmeyer, Jr. 3rd ed, Chapter 2, p. 50.*
"The Textbook of Polymer Science", Billmeyer, 3rd Ed, p. 50.*
Textbook of Polymer Science—Billmeyer,Jr,3rd Edition, pp. 50-51.*
Technique of Formulating Fluoro Rubber, Wang, Zuoling, World Rubber Industry, vol. 5, 1998, pp. 53-62.
Database WPI, Section Ch, Week 199927, Derwent Publications Ltd., London GB; Class A14, AN 1999-323625 XP002397719 & JP 11 116710 A (Daikin Kogyo KK) Apr. 27, 1999, abstract.

* cited by examiner

*Primary Examiner*—Duane Smith
*Assistant Examiner*—Ives Wu
(74) *Attorney, Agent, or Firm*—Nixon & Vanderhye P.C.

(57) ABSTRACT

Moldings of fluoro rubbers produced by crosslinking a tetrafluoroethylene/propylene copolymer or a tetrafluoroethylene/propylene/vinylidene fluoride copolymer, which have metal contents of 1.5% by mass or below in terms of metal elements and are suitable for use applications necessitating clean environment, for example, manufacturing or carrier equipment for semiconductors, manufacturing equipment, carriers, or storage containers for food, or medical supplies.

5 Claims, No Drawings

MOLDINGS OF FLUORORUBBERS AND PROCESS FOR THEIR PRODUCTION

This application is the US national phase of international application PCT/JP02/09709 filed Sep. 20, 2002, which designated the US. PCT/JP2/09709 claims priority to JP Application No. 2001-293888 filed Sep. 26, 2001 and JP Application No. 2002-205999 filed Jul. 15, 2002. The entire contents of these applications are incorporated herein by reference.

BACKGROUND OF THE INVENTION

1. Technical Field

The present invention relates to fluoro rubber molded products and more particularly to fluoro rubber molded products suitable for rubber materials used for applications requiring cleanliness such as low emission gas, low eluted metal, etc. and physical and chemical durability such as plasma resistance, ozone resistance, chemical resistance, heat resistance, etc., for example, in a semiconductor producing apparatus, a semiconductor conveying apparatus, a food manufacturing apparatus, a food conveyor, a food storage and a medical appliance. The invention also relates to a producing method for obtaining these fluoro rubber molded products.

2. Background Art

A demand for high cleanliness to prevent contamination of the outside is common to rubber materials used in a semiconductor producing apparatus, a semiconductor conveying apparatus, a food manufacturing apparatus, a food conveyor, a food storage and a medical appliance. Specifically, it is important that components of a rubber material must not be released as gases or particles from the rubber material per se. In a semiconductor producing apparatus or a semiconductor conveying apparatus, physical and chemical durability such as plasma resistance, ozone resistance, chemical resistance, heat resistance, etc. is required in addition to purity because the rubber material comes into contact with various chemicals or gases and also with plasma, ozone, etc.

Therefore, fluoro rubber molded products have been heretofore often used. Fluoro rubber as a raw material, however, contains metallic elements derived from metallic salt which is generally used in the fluoro rubber as a polymerization catalyst and an emulsifying agent, and for coagulating the fluoro rubber from raw-material latex. If such fluoro rubber is used as a sealing material in a semiconductor producing apparatus using plasma gases, there is fear that the fluoro rubber may be decomposed due to its contact with plasma or ozone and volatilized so that the metallic element is released as particles to the outside.

Therefore, an object of the invention is to solve the aforementioned problem, more particularly, to provide fluoro rubber molded products suitable for rubber materials quite excellent in cleanliness such as low emission gas, low eluted metal, etc. and in physical and chemical durability such as plasma resistance, ozone resistance, chemical resistance, heat resistance, etc. compared with the background art and used in a semiconductor producing apparatus, a semiconductor conveying apparatus, a food manufacturing apparatus, a food conveyor, a food storage and a medical appliance. Another object of the invention is to provide a producing method for obtaining these fluoro rubber molded products.

SUMMARY OF THE INVENTION

The present inventors have made elaborate investigation eagerly to solve the aforementioned problem. As a result, it has been found that crosslinking a tetrafluoroethylene-propylene copolymer or tetrafluoroethylene-propylene-vinylidene fluoride terpolymer prepared in such a manner that the amount of metal contained is reduced to be not larger than a specific amount is effective.

That is, the invention provides a fluoro rubber molded product and a method for producing the same as follows.

(1) A fluoro rubber molded product characterized by comprising either of a crosslinked tetrafluoroethylene-propylene copolymer and a crosslinked tetrafluoroethylene-propylene-vinylidene fluoride terpolymer, the crosslinked copolymer or terpolymer having a metallic component content of not higher than 1.5% by mass in terms of a quantity based on metallic elements.

(2) A fluoro rubber molded product according to the (1), characterized in that the crosslinking is performed with peroxide.

(3) A fluoro rubber molded product according to the (2), characterized in that the crosslinking is further performed by ionizing radiation exposure.

(4) A fluoro rubber molded product according to the (2) or (3), characterized in that 0.1 to 20 parts bymass of triallyl isocyanurate as a crosslinking coagent are mixed with 100 parts by mass of the tetrafluoroethylene-propylene copolymer.

(5) A fluoro rubber molded product according to any one of the (2) through (4), characterized in that the metallic element content is not higher than 5000 ppm.

(6) A fluoro rubber molded product according to the (1), characterized in that the crosslinking is performed by ionizing radiation exposure.

(7) A fluoro rubber molded product according to any one of the (1) through (6), characterized in that the amount of emission gas is not higher than 3 ppm when the fluoro rubber molded product is held at a temperature of 100° C. for 30 minutes.

(8) A method of producing a fluoro rubber molded product, characterized by comprising the step of crosslinking either of a tetrafluoroethylene-propylene copolymer and a tetrafluoroethylene-propylene-vinylidene fluoride terpolymer which is prepared as a starting material to have a metallic component content of not higher than 1.5% by mass in terms of a quantity based on metallic elements.

(9) A method of producing a fluoro rubber molded product according to the (8), characterized in that a mixture containing a starting material and a peroxide crosslinking agent or a mixture containing a starting material, a peroxide crosslinking agent and a crosslinking coagent is heat-molded into a crosslinked body.

(10) A method of producing a fluoro rubber molded product according to the (9), characterized in that the crosslinked body is further irradiated with an ionizing radiation.

(11) A method of producing a fluoro rubber molded product according to the (9) or (10), characterized in that either of a tetrafluoroethylene-propylene copolymer and a tetrafluoroethylene-propylene-vinylidene fluoride terpolymer prepared to have a metallic component content of not higher than 5000 ppm is used as the starting material.

(12) A method of producing a fluoro rubber molded product according to the (8), characterized in that the starting material is preformed into a predetermined shape and then a preformed body is irradiated with an ionizing radiation.

(13) A method of producing a fluoro rubber molded product according to any one of the (8) through (12), characterized in that the molded product obtained by crosslinking is further subjected to a cleaning treatment using pure water, a heat treatment at a temperature of not lower than 150° C. or a combination of the cleaning treatment and the heat treatment.

The invention further provides the following rubber materials as preferred applications of the fluoro rubber molded product described in any one of the (1) through (7).

(14) A rubber material for use in a semiconductor producing apparatus or a semiconductor conveying apparatus, characterized by comprising a fluoro rubber molded product according to any one of the (1) through (7).

(15) A rubber material for use in a food manufacturing apparatus, a food conveyor or a food storage, characterized by comprising a fluoro rubber molded product according to any one of the (1) through (7).

(16) A rubber material for use in a medical appliance, characterized by comprising a fluoro rubber molded product according to any one of the (1) through (7).

DESCRIPTION OF THE PREFERRED EMBODIMENT

The invention will be described below in detail.

In the invention, a tetrafluoroethylene-propylene copolymer or a tetrafluoroethylene-propylene-vinylidene fluoride terpolymer used as a molding material is processed by a process which will be described later so that the copolymer or terpolymer has a metallic component content of not higher than 1.5% by mass in terms of a quantity based on metallic elements. The tetrafluoroethylene-propylene copolymer or the tetrafluoroethylene-propylene-vinylidene fluoride terpolymer is crosslinked with a peroxide crosslinking agent or by irradiation with an ionizing radiation to thereby obtain a fluoro rubber molded product according to the invention. Incidentally, in the following description, a fluoro rubber molded product produced due to a peroxide crosslinking agent is referred to as "peroxide crosslinked fluoro rubber molded product" whereas a fluoro rubber molded product produced due to irradiation with an ionizing radiation is referred to as "radiation crosslinked fluoro rubber molded product".

(Peroxide Crosslinked Fluoro Rubber Molded Product)

In the invention, the tetrafluoroethylene-propylene copolymer is a copolymer containing tetrafluoroethylene and propylene as main components. Although "AFLAS" made by Asahi Glass Co., Ltd., etc. can be taken as an example of the copolymer, the copolymer is not limited thereto. The copolymer may be replaced by a terpolymer containing a third component such as hexafluoropropylene, ethylene, perfluoroalkylvinyl ether, or the like, in addition to tetrafluoroethylene and propylene. The copolymer may contain a peroxide crosslinking site such as iodine, bromine, or the like.

The sum of the molar fraction of a polymerized unit based on tetrafluoroethylene and the molar fraction of a polymerized unit based on propylene in the tetrafluoroethylene-propylene copolymer is preferably not lower than 60%, more preferably not lower than 85%, most preferably not lower than 95% of the sum of the molar fractions of all polymerized units. The molar ratio of (the polymerized unit based on tetrafluoroethylene: the polymerized unit based on propylene) is preferably in a range of from (40:60) to (65:35), more preferably in a range of from (50:50) to (60:40).

The ratio of polymerized units based on respective monomers in the tetrafluoroethylene-propylene-vinylidene fluoride terpolymer is preferably in a range of from (50:49:1) to (40:20:40), more preferably in a range of from (50:48:2) to (42:20:38) in terms of the molar ratio of (the polymerized unit based on tetrafluoroethylene: the polymerized unit based on propylene: the polymerized unit based on vinylidene fluoride).

For example, the tetrafluoroethylene-propylene copolymer and the tetrafluoroethylene-propylene-vinylidene fluoride terpolymer can be produced from copolymer or terpolymer latex. The term "latex" means a suspension of a copolymer or terpolymer emulsified and dispersed into water. A material available on the market can be used as latex of the tetrafluoroethylene-propylene copolymer. Or latex produced as an intermediate product when the copolymer is synthesized from monomer materials by emulsion polymerization may be used. For example, latex as an intermediate product of the tetrafluoroethylene-propylene copolymer as introduced by Japanese Patent Publication No. 8086/1986 can be used as it is. Or latex prepared by dispersing a solid tetrafluoroethylene- propylene copolymer into water may be used. The latex may be blended with other copolymer latex such as vinylidene fluoride-hexafluoropropylene copolymer latex, vinylidene fluoride-hexafluoropropylene-tetrafluoroethylene terpolymer latex, vinylidene fluoride-hexafluoropropylene-perfluoromethylvinyl ether terpolymer latex, ethylene-tetrafluoroethylene-perfluoromethylvinyl ether terpolymer latex, NBR latex, SBR latex, etc. Rubber coagulated and coprecipitated from the blended latex has an advantage that respective rubber phases are dispersed finely and homogeneously. A material available on the market can be also used as latex of the tetrafluoroethylene-propylene-vinylidene fluoride terpolymer.

To reduce the amount of contained impurities such as metallic components etc., the tetrafluoroethylene-propylene copolymer latex or the tetrafluoroethylene-propylene-vinylidene fluoride terpolymer latex is first brought into contact with inorganic non-metallic salt, specific acid or specific organic material to thereby be coagulated. Although ammonium salt such as ammonium chloride, ammonium acetate, ammonium sulfate, or the like, can be used as the inorganic non-metallic salt, the inorganic non-metallic salt is not limited thereto. Preferably, ammonium sulfate or ammonium acetate may be used. Especially, ammonium acetate is preferred. Although hydrochloric acid, sulfuric acid, nitric acid, etc. can be used as the acid, the acid is not limited thereto. Preferably, hydrochloric acid or sulfuric acid may be used. An organic compound containing no metal is used as the organic material. Examples of the organic compound include: organic acid such as carboxylic acid, etc.; alcohol such as propanol, etc.; ketone such as methyl ethyl ketone, acetone, etc.; ester such as ethyl acetate, etc.; and chlorinated hydrocarbon such as dichloromethane, tetrachloromethane, etc. The organic compound is not limited thereto. Preferably, acetic acid, methyl ethyl ketone or ethyl acetate may be used. Especially, methyl ethyl ketone is preferred. By coagulation with these coagulating agents, a tetrafluoroethylene-propylene copolymer or a tetrafluoroethylene-propylene-vinylidene fluoride terpolymer substantially free from impurities, especially metallic components, is obtained.

Although a required minimum amount of the coagulating agent allowing the copolymer or terpolymer to be coagulated and separated from the latex can be used, the amount of the coagulating agent used can be changed suitably according to the concentration of latex, the kind of the coagulating agent, etc. When the coagulating agent is used as a solution, the solvent used is not particularly limited. Alcohol, water-ethanol mixture solvent, water-acetone mixture solvent, etc. can be used. When liquid such as acetic acid, methyl ethyl ketone, or the like is used as the coagulating agent, it is unnecessary to use any special solvent. When inorganic non-metallic salt is used, the inorganic non-metallic salt maybe however preferably used in the form of an aqueous solution. The concentration is not particularly limited either. Acetic acid, methyl ethyl ketone or the like may be used at a concentration of 100%. Incidentally, the concentration of inorganic non-metallic salt solvent is selected to be preferably in a range of from 0.01% by mass to 50% by mass, more preferably in a range of from about 0.5% by mass to about 20% by mass. The amount of the aqueous solution of coagulating agent used is selected to be preferably in a range of from 200 parts by mass to 1000 parts by mass, more preferably in a range of from about 250 parts by mass to about 500 parts by mass with respect to 100 parts by mass of the latex. Usually, a method of adding the latex into the aqueous solution of the coagulating agent is preferably used. Incidentally, the sequence of addition of the latex and the aqueous solution of the coagulating agent is not limited thereto. For example, the aqueous solution of the coagulating agent may be added into the latex, or the latex and the aqueous solution of the coagulating agent may be mixed simultaneously.

The mixing method is not particularly limited either. For example, mixing can be made by a mixer such as a propeller mixer, a turbine mixer, a paddle mixer, a reciprocating rotary mixer, a pipeline mixer, a volute pump, an anchor mixer, a gate mixer, a ribbon mixer, a homomixer, an ultrasonic mixer, a high-pressure homogenizer, etc. The coagulation temperature is preferably in a range of from 5° C. to 90° C., more preferably in a range of from 10° C. to 40° C.

The solid content coagulated and separated is then washed with water. Examples of the water cleaning method include batch water cleaning for performing water cleaning in the condition that the solid content coagulated and separated and water are put in the mixer, and cleaning with water flowing on a filter. The water cleaning method is not limited to these. The temperature of cleaning water is preferably in a range of from 0° C. to 80° C., more preferably in a range of from 10° C. to 50° C. The electric conductivity of cleaning water is preferably in a range of from 0.055 μS/cm to 200 μS/cm, more preferably in a range of from about 0.055 μS/cm to about 20 μS/cm. Especially, a range of from 0.055 μS/cm to 2 μS/cm is preferred. The solid content sufficiently washed is then dried by a hot air dryer, for example, kept at 100° C. to 150° C. to thereby obtain a tetrafluoroethylene-propylene copolymer or a tetrafluoroethylene-propylene-vinylidene fluoride terpolymer containing a small amount of metallic components. Incidentally, the drying method is not limited thereto.

The tetrafluoroethylene-propylene copolymer or the tetrafluoroethylene-propylene-vinylidene fluoride terpolymer obtained in this manner contains metallic components in an amount very small to be not higher than 1.5% by mass in terms of a quantity based on metallic elements. The smaller the amount of contained metallic components is, the better it is. The amount of contained metallic components is not larger than 5000 ppm, preferably not larger than 1000 ppm, more preferably not larger than 500 ppm, especially preferably not larger than 200 ppm. In a further preferred form, both iron content and alkali metal content are low and each of the contents is not higher than 500 ppm, especially not higher than 100 ppm in terms of the mass of the element. In an especially preferred form, each of the content of phosphorus or its compound, the content of calcium or its compound and the content of aluminum or its compound is not larger than 500 ppm in terms of the mass of the element.

The tetrafluoroethylene-propylene copolymer or the tetrafluoroethylene-propylene-vinylidene fluoride terpolymer, which can be crosslinked accurately and efficiently with peroxide, may be heat-treated in a specific condition after coagulation so that crosslinking with peroxide can be further accelerated. It is inferable that this is because a dehydrofluorinating reaction or the like occurs in part of the tetrafluoroethylene-propylene copolymer or the tetrafluoroethylene-propylene-vinylidene fluoride terpolymer by the heat treatment so that double bonds are generated so as to act as crosslinking sites. At the same time, a low molecular weight component in the tetrafluoroethylene-propylene copolymer or the tetrafluoroethylene-propylene-vinylidene fluoride terpolymer is removed by the heat treatment, so that reduction in emission gas can be expected.

The facilitation of peroxide crosslinking can be easily adjusted by the heat-treatment condition. The heat-treatment temperature is preferably in a range of from 250° C. to 400° C., more preferably in a range of from 280° C. to 380° C., especially preferably in a range of from 300° C. to 350° C. If the treatment temperature is low, it is difficult to generate crosslinking sites and there is also the possibility that emission gas cannot be reduced sufficiently. If the treatment temperature is too high, deterioration of the tetrafluoroethylene-propylene copolymer or the tetrafluoroethylene-propylene-vinylidene fluoride terpolymer and lowering of physical properties caused by the deterioration may be brought about. On the other hand, the treatment time can be set desirably in accordance with the composition of the tetrafluoroethylene-propylene copolymer or the tetrafluoroethylene-propylene-vinylidene fluoride terpolymer and the treatment temperature. The treatment time is selected to be preferably in a range of from 15 minutes to 50 hours, more preferably in a range of from 30 minutes to 20 hours, especially preferably in a range of from 1 hour to 10 hours so that an elastic solid state is not spoiled. If the treatment time is very short, it is difficult to introduce crosslinking sites sufficiently and it is also difficult to reduce emission gas. Incidentally, in the case of the tetrafluoroethylene-propylene-vinylidene fluoride terpolymer, the heat treatment need not be carried out.

To crosslink the tetrafluoroethylene-propylene copolymer or the tetrafluoroethylene-propylene-vinylidene fluoride terpolymer with peroxide, for example, a peroxide crosslinking agent and a crosslinking coagent which will be described below may be used.

Examples of the peroxide crosslinking agent include di-t-butyl peroxide, dicumyl peroxide, t-butyl cumyl peroxide, 1,1-di(t-butylperoxy)-3,3,5-trimethylcyclohexane, benzoyl peroxide, n-butyl-4,4-bis(t-butylperoxy)valerate, α,α'-bis(t-butylperoxy)diisopropylbenzene, 2,5-dimethyl-2,5-bis(t-butylperoxy)hexane, 2,5-dimethyl-2,5-bis(t-butylperoxy)hexyne-3, t-butyl cumyl peroxide, di-t-butyl peroxide, etc. The peroxide crosslinking agent is not limited to these.

A crosslinking coagent or the like may be used in combination. Examples of the crosslinking coagent include sulfur, p-quinone dioxime, p,p'-dibenzoylquinone dioxime, lauryl methacrylate, ethylene glycol acrylate, triethylene glycol dimethacrylate, tetraethylene glycol dimethacrylate, polyethylene glycol dimethacrylate, trimethylolpropane trimethacrylate, methylol methacrylate, diaryl fumarate, diaryl phthalate, tetraaryl oxyethane, triaryl cyanurate, triallyl isocyanurate, maleimide, phenyl maleimide, N,N'-m-phenylenebismaleimide, maleicanhydride, itaconic acid, divinyl benzene, vinyl toluene, 1,2-polybutadiene, etc. Especially, triallyl isocyanurate is preferred. When these are mixed with rubber at a ratio of 0.1 to 10 parts by mass, preferably 1 to 10 parts by mass to 100 parts by mass of the rubber weight, a fluoro rubber molded product high in strength can be obtained.

The fluoro rubber molded product according to the invention may contain an organic filler such as a polytetrafluoroethylene resin, a polyethylene resin, a polypropylene resin, a phenol resin, a polyimide resin, a melamine resin, or the like; or a reinforcing fiber filler such as cotton, rayon, nylon, polyester, or the like. A plurality of fillers may be contained. When these fillers are contained, both strength and hardness of the molded product can be enhanced.

Crosslinking with the peroxide crosslinking agent can be performed according to an ordinary crosslinking method for molding fluoro rubber. That is, a molding material, which is prepared by mixing the tetrafluoroethylene-propylene copolymer or the tetrafluoroethylene-propylene-vinylidene fluoride terpolymer, the peroxide crosslinking agent and the crosslinking coagent and further mixing various kinds of fillers if necessary, is put into a predetermined molding tool and heat-pressed. The molding condition can be selected suitably according to the composition of the molding material and the application. Generally, as crosslinking of fluoro rubber, secondary crosslinking by use of an oven or the like is performed in addition to primary crosslinking by press molding or the like. Also in the invention, crosslinking of fluoro rubber may be performed in the same manner. Secondary crosslinking is generally performed at a temperature of 150° C. to 280° C. for about 1 hour to about 50 hours. This condition is close to the heat-treatment condition used in the invention. Accordingly, when the fluoro rubber molded product is secondarily crosslinked sufficiently, the residue of peroxide can be restrained from forming emission gas.

When crosslinkage by use of an ionizing radiation is added to the fluoro rubber molded product, the degree of crosslinking increases so that chemical resistance is improved in addition to improvement in low gas emission and low metal elution. The ionizing radiation crosslinking is preferred as an additional crosslinking method because there is neither crosslinking agent nor acid acceptor required so that the molded product does not contain any contaminant such as metallic salt, metal oxide, etc. derived from the crosslinking agent and the acid acceptor, and that the molded product is not colored when crosslinked.

With respect to the kind of the ionizing radiation, any radiation can be applied to the invention if the radiation is an electromagnetic wave or particle beam having the ability of ionizing air directly or indirectly. Although examples of the ionizing radiation include α-ray, β-ray, γ-ray, deuteron radiation, proton radiation, neutron radiation, X-ray, electron beam, etc., the ionizing radiation is not limited to these. These radiations may be used in combination. In the invention, γ-ray and electron beam may be preferably used in view of easiness of handling. Especially, γ-ray is preferred. Because γ-ray has high penetrating power, the fluoro rubber molded product can be crosslinked evenly and sterilized simultaneously with the crosslinking. Irradiation with γ-ray is preferably performed in a vacuum or inert gas atmosphere. An oxygen atmosphere is not preferred because there is the possibility that the crosslinking structure may be decomposed in the oxygen atmosphere. Irradiation with electron beam may be performed in air.

When the fluoro rubber molded product is irradiated with the ionizing radiation, further crosslinking of the crosslinking structure and decomposition thereof occur simultaneously. If the radiation dose is too large, there is the possibility that physical properties may be lowered because decomposition becomes dominant. If the radiation dose is too small, the effect of further crosslinking cannot be obtained. In the invention, it is therefore preferable that the dose of the ionizing radiation is in a certain suitable range. The total radiation dose is preferably in a range of from 10 kGy to 500 kGy, more preferably in a range of from 30 kGy to 350 kGy, further preferably in a range of from 60 kGy to 300 kGy. When the dose of the ionizing radiation is in the aforementioned range, a fluoro rubber molded product good in physical properties can be obtained.

A radiation source or the like is not particularly limited. Although $^{60}$Co, $^{137}$Cs, $^{85}$Kr, or the like having radioactivity in a range of from the order of tens of thousands of Ci to the order of hundreds of thousands of Ci can be taken as an example of the radiation source, the radiation source is not limited thereto. More preferably, $^{60}$Co is used and the copolymer or terpolymer according to the invention is irradiated with the radiation in a vacuum or under inert gas atmosphere for 1 hour to 50 hours, especially for from 6 hours to 30 hours. A sensitizer such as an acrylic compound, maleimide, or the like may be mixed with the copolymer or terpolymer to reduce the dose to thereby shorten the irradiation time. The irradiation temperature is not particularly limited either. For example, the irradiation can be performed at −20° C. to 100° C., especially at 0° C. to 50° C.

(Radiation Crosslinked Fluoro Rubber Molded Product)

The same tetrafluoroethylene-propylene copolymer or tetrafluoroethylene-propylene-vinylidene fluoride terpolymer used in the aforementioned peroxide crosslinked fluoro rubber molded product can be also used in the radiation crosslinked fluoro rubber molded product.

The copolymer or terpolymer is prepared as a molding material to have a metallic component content of not higher than 1.5% by mass. The same filler as used in the peroxide crosslinked fluoro rubber molded product may be mixed with the molding material.

The molding material is preformed into a target shape. The molding method is however not limited. Heat pressing using a mold, extrusion molding, injection molding, blow molding or transfer molding can be selected suitably.

It is preferable that the ionizing radiation used for crosslinking and the irradiation condition therefor are the same as those in ionizing radiation irradiation performed for additional crosslinking in the peroxide crosslinked fluoro rubber molded product.

Both the peroxide crosslinked fluoro rubber molded product and the radiation crosslinked fluoro rubber molded product are sufficiently low in gas emission and metal elution. Specifically, emission gas is reduced so that the amount of gas emitted when the fluoro rubber molded product is left at a temperature of 100° C. for 30 minutes is not larger than 3 ppm.

In the invention, either of a cleaning treatment with pure water and a heat treatment at a temperature of not lower than 150° C. or a combination of the cleaning treatment and the heat treatment may be further applied so that greater reduction in emission gas can be expected. Incidentally, the heat treatment is preferably performed in an inert gas atmosphere. The pure water used for cleaning is pure water highly free from fine particles, metal ions, live bacteria, organic material, dissolved oxygen, etc. The electric conductivity of the pure water is selected to be preferably in a range of from 0.055 μS/cm to 200 μS/cm, more preferably in a range of from about 0.055 μS/cm to about 20 μS/cm. Especially, a range of from 0.055 μS/cm to 2 μS/cm is preferred. The cleaning method is not particularly limited either. Although a method of immersing the fluoro rubber molded product in pure water, a method of spraying pure water onto the fluoro rubber molded product, a method of exposing the fluoro rubber molded product to pure water steam, or the like can be taken as an example of the cleaning method, the cleaning method is not limited to these. It is however preferable that a method of immersing the fluoro rubber molded product in pure water at a water temperature of not lower than 50° C. for an immersion time of not shorter than 10 seconds is used in the invention. More preferably, the immersion is performed at a temperature of not lower than 80° C. for 30 seconds to 24 hours. Especially preferably, the immersion is performed at a temperature of not lower than 90° C. for 1 minute to 2 hours. The immersion at a higher temperature for a longer time permits greater reduction in gas emitted from the fluoro rubber molded product.

As described above in detail, the fluoro rubber molded product according to the invention is remarkably excellent in cleanliness such as low emission gas, low eluted metal, etc. and physical and chemical durability such as plasma resistance, ozone resistance, chemical resistance, heat resistance, etc. compared with the background art. Accordingly, the fluoro rubber molded product according to the invention is suitable for clean environment such as a semiconductor producing apparatus, a semiconductor conveying apparatus, a food manufacturing apparatus, a food conveyor, a food storage, a medical appliance, etc. For example, in the semiconductor producing field, the fluoro rubber molded product according to the invention can be used in semiconductor producing apparatuses such as a wet cleaning apparatus, a plasma etching apparatus, a plasma ashing apparatus, a plasma CVD apparatus, an ion-implantation apparatus and a sputtering apparatus and in wafer conveying devices which are devices attached to these apparatuses. In the medical field, the fluoro rubber molded product according to the invention can be used in tubes and rubber stoppers. In the food field, the fluoro rubber molded product according to the invention can be used in heat exchanger gaskets, etc. The invention also includes: a rubber material made of the fluoro rubber molded product and for use in a semiconductor producing apparatus or a semiconductor conveying apparatus; a rubber material made of the fluoro rubber molded product and for use in a food manufacturing apparatus, a food conveyor or a food storage; and a rubber material made of the fluoro rubber molded product and for use in a medical appliance.

Although the invention has been described in detail and with reference to a specific embodiment, it is obvious to those skilled in the art that various changes and modifications may be made without departing from the spirit and scope of the invention.

Incidentally, this application is based on a Japanese Patent application (Japanese Patent Application No. 2001-293888) filed on Sep. 26, 2001 and a Japanese Patent application (Japanese Patent Application No. 2002-205999) filed on Jul. 15, 2002, the contents of which are incorporated herein by reference.

EXAMPLES

The invention will be further described below on the basis of Examples and Comparative Examples. The invention is not limited to the following Examples.

Example 1

Into a stainless steel autoclave with an inner volume of 100 mL, 40 g of ion-exchanged water, 5 g of tertiary butanol, 0.5 g of $C_8F_{17}COONH_4$, 1 g of $Na_2HPO_4.12H_2O$ and 0.1 g of NaOH were put and 0.5 g of ammonium persulfate dissolved in a small amount of water were added. After the autoclave was cooled by liquid nitrogen, 5 g of an aqueous solution prepared in advance and containing 0.0075 g of $FeSO_4.7H_2O$, 0.009 g of EDTA (disodium ethylenediaminetetraacetate with $2H_2O$, which can apply hereunder) and 0.04 g of $CH_2(OH)SO_2Na$ were added into the autoclave and the inside of the autoclave was evacuated. The pH of a catalyst-containing aqueous medium obtained in this manner was 9.1.

Into the autoclave in which the catalyst-containing aqueous medium had been reserved, 8.2 g of a mixture gas of tetrafluoroethylene and propylene with the molar ratio $C_2F_4/C_3H_6$ adjusted to 85/15 were put. The autoclave was vibrated in a temperature-controlled bath adjusted to 25° C. to thereby carry out a copolymerization reaction. As a result, tetrafluoroethylene-propylene copolymer latex containing $C_2F_4/C_3H_6$ in a molar ratio of 55/45 and having molecular weight of 133000 was obtained at a copolymerization reaction rate of 120 g/L·hr.

An aqueous solution of ammonium acetate (at a concentration of 10% by mass) five times as much as the latex was put into a coagulation tank and stirred while the latex was added dropwise. By this operation, the latex was coagulated and separated. The solid content coagulated and separated was washed with water and then dried. Crude rubber obtained in this manner little contained any emulsifying agent and other polymerizing sub-materials.

Then, the crude rubber was heated in a Geer oven at 300° C. for 8 hours.

By a twin roll, 100 parts by mass of the obtained tetrafluoroethylene-propylene copolymer (Table 1: TFE/P), 1 part by mass of 1,1-di-(t-butylperoxy)-3,5-trimethylcyclohexane (Table 1: crosslinking coagent "PERBUTYL P" made by NOF Corporation) and 2 parts by mass of triallyl isocyanurate (Table 1: crosslinking coagent "TAIC" made by Nippon Kasei Chemical Co., Ltd.) were kneaded. The mixture was molded into a 100 mm×100 mm×2 mm sheet by heat pressing at 150° C. (primary crosslinking). The sheet was further put into the Geer oven and secondarily crosslinked at 200° C. for 4 hours.

The obtained rubber sheet was immersed in 500 mL of pure water (specific resistivity: about 18 MΩ·cm) at 90° C. to 95° C. for 10 minutes. During this time, pure water of the aforementioned purification degree was continuously poured at 100 mL/min. After the immersion, the rubber sheet was taken out and left at 200° C. for 12 hours in the oven in which nitrogen (purity: 99.9998%) wassubstituted. During this time, nitrogen of the aforementioned purity was continuously poured at 5 L/min. The sample obtained in this manner was evaluated as follows.

(Evaluation Items and Methods)

Qualitative and quantitative analysis of contained metallic elements: Into a platinum crucible, 1 g of a crosslinked molded product weighed was put. The crosslinked molded product was heated by a burner so as to be decomposed. Into the residue, 10 mL of 30% by mass of hydrochloric acid was added. The residue was heated and dissolved in the hydrochloric acid and diluted with water to form a predetermined volume of 50 mL. The solution obtained in this manner was used for qualitative and quantitative analysis of contained metal by inductively coupled plasma atomic emission spectroscopy (ICP-AES).

Qualitative and quantitative analysis of emission gas: Emission gas was analyzed by purge-and-trap gas chromatograph mass spectrometry. The heating condition was set to be 100° C. and 30 minutes. He was used as a purge gas. In the quantitative analysis, n-decane was used as a standard substance.

Hardness: This was measured according to JIS K 6253.

Tensile strength, elongation at break and tensile stress at 100% elongation: These were measured according to JIS K 6251. Dumbbell No. 3 was used.

Compression set: This was measured according to JIS K 6262. The condition was set to be 200° C. and 70 hours. Table 1 shows results.

Example 2

The same cleaning and heat treatments as in Example 1 were carried out and the same evaluation as in Example 1 was performed except that the rubber sheet described in Example 1 was further irradiated with γ-rays of 120 kGy. Table 1 shows results.

Example 3

A rubber sheet was obtained in the same manner as in Example 1 except that the crosslinking coagent (triallyl isocyanurate) used in Example 1 was replaced by trimethylolpropane trimethacrylate (Table 1: crosslinking coagent "TMTP" made by Mitsubishi Rayon Co., Ltd.). The same evaluation as in Example 1 was performed. Table 1 shows results.

Comparative Example 1

Into a tetrafluoroethylene-propylene copolymer ("AFLAS 100H" made by Asahi Glass Co., Ltd.) available on the market, a crosslinking agent and a crosslinking coagent were added at the same mixture ratio as in Example 1. The mixture was crosslinked in the same manner as in Example 1 to thereby obtain a rubber sheet. The rubber sheet was evaluated in the same manner as in Example 1. Table 1 shows results.

TABLE 1

| | Example 1 | Example 2 | Example 3 | Comparative Example 1 |
|---|---|---|---|---|
| Copolymer | TFE/P | TFE/P | TFE/P | AFLAS 100 H |
| Crosslinking agent (PERBUTYL P) [phr] | 1 | 1 | 1 | 1 |
| Crosslinking coagent (TAIC) [phr] | 2 | 2 | | 2 |
| Crosslinking coagent (TMTP) [phr] | | | 2 | |
| γ-ray dose [kGy] | — | 120 | — | — |
| Impurities content [ppm (μg/g)] | | | | |
| Na | 9.10 | 9.10 | 14.9 | 71.5 |
| Mg | — | — | 6.54 | 1.71 |
| Ca | 2.01 | 2.01 | 7.77 | 7730 |
| Fe | 0.81 | 0.81 | 0.84 | 50.1 |
| Zn | — | — | — | 12.3 |
| Sr | — | — | — | 4.23 |
| Ba | 0.03 | 0.03 | 0.20 | — |
| Total metal content | 11.9 | 11.9 | 58.7 | 7870 |

TABLE 1-continued

| | Example 1 | Example 2 | Example 3 | Comparative Example 1 |
|---|---|---|---|---|
| P | — | — | — | 3549 |
| S | — | — | — | 141 |
| Total quantity of emission gas [ppm] | 0.35 | 0.35 | 1.87 | 0.97 |
| Aliphatic hydrocarbon (derived from base polymer) [ppm] | 0.09 | 0.09 | 0.61 | 0.25 |
| Alcohol, ketone (cracked residue of crosslinking agent) [ppm] | 0.05 | 0.05 | 0.84 | 0.32 |
| TAIC [ppm] | 0.21 | 0.21 | 0.42 | 0.40 |
| Hardness [JIS-A] | 49 | 53 | 48 | 52 |
| Tensile strength [MPa] | 18.6 | 11.0 | 2.2 | 20.4 |
| Elongation at beak [%] | 680 | 250 | 1600 | 750 |
| Tensile stress at 100% elongation [MPa] | 1.0 | 1.3 | 0.6 | 1.1 |
| Compression set (200° C. * 70 hours) [%] | 57 | 16 | 99 | 77 |

As shown in Table 1, the metal content of the rubber sheet in each Example according to the invention was reduced greatly compared with that of the rubber sheet in Comparative Example 1. The amount of emission gas from the rubber sheet in each of Examples 1 and 2 was also reduced greatly. On the contrary, the rubber sheet in Comparative Example 1 contained particularly a large amount of sodium, calcium and iron.

Examples 4 to 6 and Comparative Examples 2 to 7

Each raw-material rubber mixed as shown in Table 2 was set in a mold and preheated by a heat press until the temperature of the mold reached 170° C. Then, the mold was pressed and held for about 10 minutes. Then, the mold was taken out from the heat press and cooled until the temperature of the mold was not higher than 60° C. Then, the raw-material rubber was released from the mold to thereby obtain a preform. In each of Examples 4 and 6 and Comparative Examples 4 to 7, the preform was irradiated with γ-rays of 80 kGy dose in a nitrogen atmosphere to thereby obtain a fluoro rubber molded product. In Example 5, the preform was irradiated with y-rays of 120 kGy dose in a nitrogen atmosphere to thereby obtain a fluoro rubber molded product. In Comparative Example 3, crosslinking was performed with a crosslinking agent. Incidentally, details of fluoro rubber and fillers used in Examples 4 to 6 and Comparative Examples 2 to 6 are as follows.

Fluoro rubber (1): This is fluoro rubber which is prepared by coagulation latex of a tetrafluroroethylene-propylene copolymer ("AFLAS 150C" made by Asahi Glass Co., Ltd.) with ammonium acetate and which contains 0.6% by mass of metallic components.

Fluoro rubber (2): This is fluoro rubber which is prepared by heating the fluoro rubber (1) at 250° C. for 24 hours.

Fluoro rubber (3): This is "AFLAS 100H" (tetrafluroroethylene-propylene copolymer) made by Asahi Glass Co., Ltd.

Fluoro rubber (4): This is "DAIEL G912" (vinylidene fluoride-hexafluoropropylene-tetrafluroroethylene terpolymer) made by Daikin Industries, Ltd.

Fluoro rubber (5): This is "DAIEL G801" (vinylidene fluoride-hexafluoropropylene copolymer) made by Daikin Industries, Ltd.

Crosslinking agent: This is "PERHEXA 25B" made by NOF Corporation.

Co-crosslinking agent: This is "TAIC" made by Nippon Kasei Chemical Co., Ltd.

Filler: This is "ST-495M" (titanium oxide) made by Titan Kogyo Kabushiki Kaisha.

Each fluoro rubber molded product was evaluated with respect to the following items. Table 2 also shows results.

Evaluation Items and Methods

Moldability: The external appearance of the molded product was evaluated by eye observation. The case where moldability was so poor that a cave-in or the like in the parting line was observed was regarded as "X". The case where moldability was so good that the cave-in or the like was not observed was regarded as "○".

Metallic Element Content: This was evaluated on the basis of mass loss percentage in thermal mass spectrometric analysis. Incidentally, the measuring condition was a temperature of from room temperature to 600° C. and a temperature rise rate of 10° C./min in air.

Tensile Strength: This was measured according to JIS K 6251. Incidentally, a P26 O-ring was used as a test piece.

Compression Set: This was measured according to JIS K 6262. Incidentally, the condition was set to be 200° C. and 22 hours.

Plasma Resistance: The P26 O-ring was subjected to a plasma irradiation test. The irradiation condition and the evaluation method were as follows.

Kind of Plasma Gas: oxygen

Gas Flow Rate: 20 SCCM

Microwave Frequency: 13.56 MHz

Microwave Output: 150 W

Irradiation Time: 2 hours

Evaluation Method: Mass loss per unit area was measured. The case where particles were little generated was regarded as "○". The case where particles were more or less generated was regarded as "Δ". The case where a large number of particles were generated was regarded as "x".

Crack Resistance: In the condition that the P26 O-ring was elongated by 28%, the P26 O-ring was irradiated with plasma in the same manner as described above. The state of cracks generated in a surface of the P26 O-ring was evaluated by eye observation. The case where there was no crack was regarded as "○". The case where small cracks were generated was regarded as "Δ". The case where the P26 O-ring was broken was regarded as "X".

TABLE 2

| | Example 4 | Example 5 | Example 6 | Comparative Example 2 | Comparative Example 3 |
|---|---|---|---|---|---|
| Fluoro rubber | (1) | (1) | (2) | (1) | (3) |
| Crosslinking agent (PERHEXA 25B) | — | — | — | — | 2 phr |
| Crosslinking coagent (TAIC) | — | — | — | — | 2 phr |
| Filler (titanium oxide) | — | — | — | — | — |
| γ-ray dose (kGy) | 80 | 120 | 80 | — | — |
| Moldability | ○ | ○ | ○ | ○ | ○ |
| Metallic element content (mass %) | 0.6 | 0.6 | 0.6 | 0.6 | 1.8 |
| Color of molded product | Colorless and transparent | Colorless and transparent | Amber and transparent | Colorless and transparent | Brown |
| Tensile strength (MPa) | 10.6 | 10.2 | 9.3 | 0.9 | 16.2 |
| Compression set (%) | 31 | 20 | 42 | 100 | 46 |
| Plasma resistance Mass loss (mg/cm$^2$) | 6.6 | 7.8 | 6.1 | 9.8 | 6.8 |
| State of generation of particles | ○ | ○ | ○ | ○ | Δ |
| Crack resistance | ○ | ○ | ○ | ○ | Δ |

| | Comparative Example 4 | Comparative Example 5 | Comparative Example 6 | Comparative Example 7 |
|---|---|---|---|---|
| Fluoro rubber | (3) | (1) | (4) | (5) |
| Crosslinking agent (PERHEXA 25B) | — | — | — | — |
| Crosslinking coagent (TAIC) | — | — | — | — |
| Filler (titanium oxide) | — | 2 phr | — | — |

TABLE 2-continued

| | | | | |
|---|---|---|---|---|
| γ-ray dose (kGy) | 80 | 80 | 80 | 80 |
| Moldability | ○ | ○ | X | X |
| Metallic element content (mass %) | 1.8 | 1.8 | 0.8 | 0.7 |
| Color of molded product | Brown | White | Colorless and transparent | Colorless and transparent |
| Tensile strength (MPa) | 10.3 | 11.6 | 4.3 | 4.1 |
| Compression set (%) | 34 | 29 | 73 | 68 |
| Plasma resistance Mass loss (mg/cm$^2$) | 5.2 | 5.1 | 13.4 | 14.7 |
| State of generation of particles | Δ | Δ | ○ | ○ |
| Crack resistance | Δ | Δ | X | X |

The compression set of the fluoro rubber molded product in each of Examples 4 to 6 according to the invention was improved remarkably compared with that of the fluoro rubber molded product in Comparative Example 2 in which γ-ray irradiation was not applied. The fluoro rubber molded product in each of Examples 4 to 6 could be used as a rubber material such as a sealing material or the like so as to bear comparison with the fluoro rubber molded product in Comparative Example 3 in which the crosslinking agent was used. With respect to plasma resistance, the fluoro rubber molded product in each of Examples 4 to 6 was very excellent in plasma resistance because mass loss was small, particles were little generated and no crack was generated even in the case where plasma irradiation was applied in the elongated state. On the other hand, in the fluoro rubber molded product in each of Comparative Examples 4 and 5, the metallic element content was higher than 1.5% by mass and a large number of particles were generated, so that there arose a problem that a limitless number of small cracks were generated when plasma irradiation was applied in the elongated state.

In the case where fluoro rubber other than the tetrafluoroethylene-propylene copolymer was used as shown in each of Comparative Examples 6 and 7, moldability was poor because there arose a problem that the surface of the molded product became depressed by shrinkage of the rubber material at the time of molding. In each of Examples 4 to 6, the problem was however avoided. Even in the case where the preform was irradiated with γ-rays, improvement in mechanical strength as equal as that in the fluoro rubber molded product in each of Examples 4 to 6 could not be obtained in the fluoro rubber molded product in each of Comparative Examples 6 and 7. With respect to plasma resistance, in the fluoro rubber molded product in each of Comparative Examples 6 and 7, mass loss was so large that the molded product was broken when irradiated with plasma in the elongated state. The fluoro rubber molded product in each of Comparative Examples 6 and 7 could not be sufficiently used as a rubber material used for the application intended by the invention.

As described above, the fluoro rubber molded product according to the invention is remarkably excellent in cleanliness such as low emission gas, low eluted metal, etc. and physical and chemical durability such as plasma resistance, ozone resistance, chemical resistance, heat resistance, etc. compared with the background art. Accordingly, the fluoro rubber molded product according to the invention is particularly suitable for a rubber material used in a semiconductor producing apparatus, a semiconductor conveying apparatus, a food manufacturing apparatus, a food conveyor, a food storage and a medical appliance.

What is claimed is:

1. A method of producing a fluoro rubber molded product comprising:

crosslinking either a tetrafluoroethylene-propylene copolymer or a tetrafluoroethylene-propylene-vinylidene fluoride terpolymer which is prepared as a starting material to have a metallic component content of not higher than 1.5% by mass in terms of a quantity based on metallic elements, wherein said molded product obtained by crosslinking is further subjected it to a cleaning treatment using pure water, a heat treatment at a temperature of not lower than 150° C. or a combination of said cleaning treatment and said heat treatment.

2. A fluoro rubber molded product comprising either a crosslinked tetrafluoroethylene-propylene copolymer or a crosslinked tetrafluoroethylene-propylene-vinylidene fluoride terpolymer, wherein said crosslinked copolymer or terpolymer has a metallic component content of not higher than 1.5% by mass in terms of a quantity based on metallic elements, wherein said crosslinked copolymer or terpolymer is obtained by subjecting it to a cleaning treatment using pure water, a heat treatment at a temperature of not lower than 150° C. or a combination of said cleaning treatment and said heat treatment.

3. A rubber material for use in a semiconductor producing apparatus or a semiconductor conveying apparatus, comprising a fluoro rubber molded product according to claim 2.

4. A rubber material for use in a food manufacturing apparatus, a food conveyor or a food storage, comprising a fluoro rubber molded product according to claim 2.

5. A rubber material for use in a medical appliance, comprising a fluoro rubber molded product according to claim 2.

* * * * *